United States Patent [19]

Genod et al.

[11] 3,862,244

[45] Jan. 21, 1975

[54] PROCESS FOR THE PURIFICATION OF PHENOL

[75] Inventors: Robert Genod; Michel Merand, both of Le Peage de Roussilon (Isere), France

[73] Assignee: Rhone-Poulenc S.A., Paris, France

[22] Filed: Feb. 11, 1974

[21] Appl. No.: 441,319

Related U.S. Application Data

[63] Continuation of Ser. No. 269,870, July 7, 1972, , which is a continuation-in-part of Ser. No. 731,636, May 23, 1968, abandoned.

[30] Foreign Application Priority Data

May 29, 1967 France .............................. 67.108248

[52] U.S. Cl. ............................................. 260/621 A

[51] Int. Cl. ........................................... C07c 37/22
[58] Field of Search ..................... 260/621 A, 621 C

[56] References Cited
UNITED STATES PATENTS 3,437,699   4/1969   Flinkinger ..................... 260/621 A

*Primary Examiner*—Bernard Helfin
*Assistant Examiner*—Norman Morgenstern
*Attorney, Agent, or Firm*—Cushman, Darby & Cushman

[57] ABSTRACT

Phenol produced by splitting isopropylbenzene hydroperoxide is purified, especially from chromogenic impurities, by heating with oxygen at a pH at least 7, and distilling the product.

7 Claims, No Drawings

PROCESS FOR THE PURIFICATION OF PHENOL

This application is a continuation of our earlier application Ser. No. 269,870 filed July 7, 1972, which in turn is a continuation in part of our application Ser. No. 731,636, filed May 23, 1968 now abandoned.

The present invention relates to the purification of phenol prepared by splitting isopropylbenzene hydroperoxide in the presence of an acid catalyst.

It is known that in the manufacture of phenol from isopropylbenzene hydroperoxide, various impurities are formed, the most volatile of which are eliminated by fractional distillation. The phenol thus obtained, although having sufficient purity for certain uses, still contains various impurities which preclude its use for the manufacture of certain derivatives. Thus, in sulphonation with sulphuric acid, these impurities, which are hereinafter called "chromogenic impurities," cause the appearance of an undesirable colouring in the sulphonation product. Notably in the case of phenolsulphonic acid derivatives employed as auxiliary tanning agents, such colouring is particularly prejudicial to the properties of the products obtained.

The appearance of colouring during sulphonation is at least partially explained by the presence in the phenol of benzofurans which react to give highly coloured compounds. The elimination of these benzofurans, which can be relatively readily effected by steam distillation, does not in itself constitute a measure by which the appearance of colouration in sulphonation can be avoided, because it had been found that the presence of benzofuran compounds in phenol is caused by condensation reactions of the latter with various impurities especially hydroxyketones such as acetol and acetoin. These two compounds give 2-methyl- and 2,3-dimethylbenzofuran respectively.

Other products of condensation derived from hydroxyacetone, acetoin and mesityl oxide are also believed to be chromogenic impurities. It is therefore particularly important to eliminate from phenol the hydroxyketone compounds which generate these condensation products, but these compounds are difficult to separate from phenol by distillation.

Various processes have been proposed for the purification of phenol to eliminate the precursors of the chromogenic impurities. A method which has been particularly used consists in promoting the condensation of these precursors with phenol in the presence of catalysts so as to form the chromogenic impurities, especially the benzofurans, which are then eliminated by extractive steam distillation.

Thus, in French Pat. No. 1.231,070, it has been proposed to treat phenol by heating it at 100°-400°C. in the presence of catalysts such as activated alumina, an activated aluminium silicate, acid or basic ion exchange resins, of strong mineral or organic acids.

In British Pat. No. 883,746, a process or purification has been described which consists in heating the phenol at a temperature between 50° and 125°C. in the presence of a sufficient quantity of a base to produce a pH of at least 6. It has been proposed to use as base alkali metal hydroxides or carbonates, amines and heterocyclic bases. These processes increase the purity of the phenol only after contact periods which render them industrially entirely uninteresting.

It has now been found, and this forms the subject of the present invention, that by subjecting phenol to a treatment with oxygen or with a gas mixture containing oxygen (for example air), at elevated temperature and at a pH at least equal to 7, and then fractionally distilling the phenol thus treated, a product is obtained which develops only a very slight colouration during sulphonation.

The phenol treated by the process of the invention may be the crude product resulting from the splitting of isoproylbenzene hydroperoxide, but it is preferable to employ distilled phenol from which the greater part of the byproducts of low boiling point, such as acetone, isopropylbenzene and alpha-methylstyrene, and of the products of high boiling point such as acetophenone and phenyl-dimethylcarbinol, have been removed.

The temperature of the reaction may be between 40° and 250°C. and preferably between 70° and 180°C.

Generally, the treatment is carried out under atmospheric pressure, but it is also possible to operate under pressure. The rate at which the oxygen-containing gas is introduced into the phenol is not critical and may accordingly vary within very wide limits.

The duration of the treatment depends upon the temperature and the impurity content of the starting phenol. Although the duration may vary within wide limits, it is ordinarily unnecessary to have recourse to treatment durations of more than 5 hours. In most cases, a duration of 1 to 3 hours is sufficient.

In order to bring the pH of the phenol to at least 7, a sufficient quantity of a mineral or organic base is added, such as sodium hydroxide, potassium hydroxide, lithium hydroxide, barium hydroxide, calcium hydroxide, an alkali metal carbonate, ammonia, an aliphatic or cycloaliphatic amine e.g. an alkylamine or cycloalkylamine containing up to 8 carbon atoms, such as mono-alkylamine, dialkylamine or cyclohexylamine; an aromatic amine e.g. an arylamine such as aniline, a hydroxyalkylamine especially lower hydroxyalkylamines such as monoethanolamine, or a heterocyclic base containing a ring nitrogen atom such as pyridine or piperidine. The quantity of base introduced into the phenol may be such that the pH exceeds a value of 9, but this is not essential. Generally speaking, a pH from 7 to 9 is sufficient to obtain a high degree of purification. The base employed may be anhydrous or in aqueous solution. Mixtures of organic and/or mineral base may also be employed.

The phenol resulting from the treatment according to the invention is subjected to the usual fractional distilling operations.

Before and after treatment, the phenol is subjected to a test for colouring during sulphonation, the colouring developed in the course of this reaction is assessed by reference to a colour scale obtained from iodine solutions of increasing concentration. This test is carried out as follows:

Into a test tube having a diameter of 1.5 cm. are introduced 1 g. of phenol heated at 50°C. and then 10 cc. of sulphuric acid having a density of 1.84, free from $NO_2$ and $NO_3$. The mixture is homogenised and the contents of the test tube are maintained at 50°C. for 10 minutes. The colouring of the specimen is then compared with the colours of a reference scale constituted by aqueous iodine solutions. Generally speaking, a colouring less than that of an N/15,000 iodine solution (i.e. one containing 1/15,000 atom of iodine per litre) is judged to be very satisfactory. For some uses, colourings as low as that of N/20,000 iodine to N/30,000 iodine are necessary.

The new process is particularly suitable for continuous operation.

The following examples illustrate the invention.

EXAMPLE I

The apparatus employed consists of a glass cylinder having a height of 600 mm. and an internal diameter of 35 mm., the conical base of which is closed by a fritted glass plate (No. 2, dimensions of the pores 40 to 90 $\mu$). The base of the reactor is connected to a source of air through a pipe. The cylindrical portion of the reactor has a double jacket for the circulation of a heating fluid. In addition, the reactor is provided with a reflux condenser.

Into this apparatus are charged, while a light current of air is passed therethrough, 387 g. of phenol obtained by the splitting of isopropylbenzene hydroperoxide and distilled to eliminate the light impurities and freed from tar to eliminate the heavy products. In the sulphuric acid colouring test, this phenol shows a colouring corresponding to N/1000 iodine. In contains 93% of phenol, 5.5% of water, 0.2% of acetophenone, 0.1% of dimethylphenylcarbanol, 0.35% of methylstyrene, 0.08% of heavy products, and traces of alpha-hydroxyacetone, mesityl oxide and 2-methylbenzofuran.

The air flow rate is adjusted to a valve corresponding to 5 litres per hour under normal pressure and temperature after the temperature of the phenol has been raised to 90°C. by passing hot ethylene glycol through the double jacket. 12 cc. of a 10% aqueous sodium hydroxide solution are then added to the phenol. The pH of the reaction medium is then 7.8. The treatment with air is continued for 2 hours under these conditions. The reaction mixture, which was initially colourless, turns pale yellow, then orange, then maroon and finally black. This mixture is worked up as follows. Into a 1-litre round-bottomed glass flask, provided with a distillation column 2m. high and 4 cm. in internal diameter, lined with stainless steel, are introduced 200 g. of distilled water, which is brought to boiling point. When the steam reaches the top of the column, 375 g. of the previously treated phenol are gradually fed in at a rate of 250 g. per hour, the feed taking place at a point of the column situated 20 cm. from the top. Simultaneously, at the top of the column a mixture of water and phenol (phenol content 6.5%) containing some of the impurities is collected. When all the phenol has been introduced, the distillation of the water is continued until the temperature in the flask reaches 140°C. In this way, an aqueous fraction of 239 g., containing 15.4 g. of phenol, is collected.

The contents of the flask are cooled to 100°C. and distillation is effected under a reduced pressure of 60 mm. Hg. In this way, 3 fractions and a residue of 144 g. are collected. The residue is distilled in a point-type column of a height of 30 cm. provided with a 250-cc. round-bottomed glass flask. In this way, a 4th fraction is obtained with a residue of 20 g. The test for sulphuric acid colouring carried out on each of the fractions thus isolated gives the results set out in the following table:

| Fractions | Weight | Sulphuric acid colouring |
| --- | --- | --- |
| 1 | 61 g. | N/15,000 iodine |
| 2 | 85 g. | N/25,000 iodine |
| 3 | 25 g. | N/25,000 iodine |
| 4 | 124 g. | N/15,000 iodine |

EXAMPLE II

Into the apparatus employed in Example I are introduced 450 g. of distilled phenol freed from tar, containing 88% of pure phenol, on which the sulphuric acid colouring test indicates a colouring corresponding to N/1000 iodine. By the procedure of Example I, 9 g. of a 20% aqueous ammonia solution are added, which brings the pH of the medium to 8.2 The rate of air flow is 5 litres per hour under normal pressure and temperature conditions and the treatment temperature is 90°. These conditions are maintained for 2 hours. 831 g. of the phenolic mixture resulting from this treatment are then subjected to steam entrainment and distillation operations as in Example I.

In the course of the steam entrainment, 322 g. of an aqueous fraction containing 41 g. of phenol are collected, and in the course of the distillation 5 fractions of phenol. The residue is 5 g. and the matter retained in the column is 58 g. The sulphuric acid colouring test carried out on the 5 phenolic fractions gives the values set out in the following Table:

| Fractions | Weight | Sulphuric acid colouring |
| --- | --- | --- |
| 1 | 44 g. | N/1000 iodine |
| 2 | 106 g. | N/20,000 iodine |
| 3 | 109 g. | N/25,000 iodine |
| 4 | 142 g. | N/25,000 iodine |
| 5 | 220 g. | N/15,000 iodine |

EXAMPLES III TO VIII

Phenol showing a colouring corresponding to N/1000 iodine in the sulphuric acid test is purified by the procedure of Example I, some of the factors being varied as indicated in the following Table. The treated product is distilled in each case as in Example I and the various fractions are subjected to the sulphuric acid colouring test. The following Table gives for each test the mean value of the colourings developed by all the fractions collected when they are subjected to the sulphuric acid test and the colouring developed by the best fraction.

| Example | Operating conditions | | | | | | Sulphuric acid colouring | |
| --- | --- | --- | --- | --- | --- | --- | --- | --- |
| | alkaline agent | | pH | Temp. °C. | Duration | Rate of air flow l./h. | average | of the best fraction |
| | nature | Quantity in % by weight calculated on the phenol. | | | | | | |
| III | NaOH | 0.25% | 7.6 | 90 | 4 h. | 130 | N/20,000 | N/25,000 |
| IV | do. | do. | do. | do. | 2 h. | do. | N/20,000 | N/25,000 |

Continued

| Example | alkaline agent | | pH | Temp. °C. | Duration | Rate of air flow l./h. | Sulphuric acid colouring | |
|---|---|---|---|---|---|---|---|---|
| | nature | Quantity in % by weight calculated on the phenol. | | | | | average | of the best fraction |
| V | do. | 0.5% | 8.7 | 110 | 2 h. | 7 | N/23,000 | N/25,000 |
| VI | Na₂CO₃ | 0.4% | 7.8 | 90 | 3h.30m. | 5 | N/27,000 | N/30,000 |
| VII | KOH | 0.4% | do. | do. | do. | do. | N/19,000 | N/20,000 |
| VIII | monoethanolamine | 0.4% | 7.2 | 90 | 2 h. | do. | N/28,000 | N/30,000 |
| VIIIA | Cyclohexylamine | 1.7 | 7.9 | | | | N/25,000 | N/30,000 |
| VIIIB | Monoethylamine | 0.76 | 8.1 | | | | N/24,000 | N/30,000 |

EXAMPLE IX

Comparative experiments applied to a phenol which gives in the sulphuric acid test a colouring comparable to that of an N/800 iodine solution, carried out under the conditions specified in the following table, and otherwise as in Example I, show the necessity of employing and alkaline agent in combination to obtain phenol of very good quality.

| Experiment | Alkaline agent | | | Operating conditions | | | | Sulphuric acid colouring | |
|---|---|---|---|---|---|---|---|---|---|
| | nature | % | pH | temperature in °C. | duration | air or nitrogen | Rate of flow l./h. | average | best fraction |
| A | — | 0 | 4.5 | 90 | 2 h. | air | 5 | N/1100 iodine | N/1800 iodine |
| B | sodium hydroxide | 0.4 | 7.8 | 90 | 2 h. | nil | 0 | N/1800 iodine | N/2000 iodine |
| C | sodium hydroxide | 0.4 | 7.8 | 90 | 2 h. | nitrogen | 5 | N/900 iodine | N/1000 iodine |
| D | sodium hydroxide | 0.4 | 7.8 | 90 | 2 h. | air | 5 | N/26000 iodine | N/28000 iodine |

We claim:

1. Process for the purification of a phenol resulting from the splitting of isopropylbenzene hydroperoxide, which consists in contacting the phenol, after it has been brought to a pH of at least 7 by addition of a mineral or organic base selected from the group consisting of sodium hydroxide, potassium hydroxide, lithium hydroxide, barium hydroxide, calcium hydroxide, alkali metal carbonates, ammonia, alkylamines and cycloalkylamines containing up to 8 carbon atoms or a lower hydroxy-alkylamine, at a temperature of 40°–250°C. with oxygen or with an oxygen containing gas, and then fractionally distilling the phenol.

2. Process for the purification of a phenol resulting from the splitting of isopropylbenzene hydroperoxide, which consists in contacting the phenol, after it has been brought to a pH of at least 7 by addition of a mineral base selected from the group consisting of sodium hydroxide, potassium hydroxide, lithium hydroxide, barium hydroxide, calcium hydroxide and alkali metal carbonates, at a temperature of 40°–250°C. with oxygen or with an oxygen containing gas, and then fractionally distilling the phenol.

3. Process according to claim 2, wherein the phenol is contacted with the oxygen of oxygen-containing gas at 70°–180°C.

4. Process according to claim 3, wherein the phenol is contacted at a pH of 7 to 9.

5. Process for the purification of an impure phenol resulting from the splitting of isopropylbenzene hydroperoxide, which comprises adjusting the pH of the impure phenol to at least 7, contacting the impure phenol having a pH of at least 7 at a temperature of 40°–250°C. with oxygen or an oxygen containing gas, and then fractionally distilling the phenol.

6. Process according to claim 5, wherein the phenol is contacted with the oxygen or oxygen-containing gas at 70°–180°C.

7. Process according to claim 5 wherein the phenol is contacted at a pH of 7 to 9.

* * * * *